United States Patent [19]

Ito

[11] Patent Number: 5,515,103
[45] Date of Patent: May 7, 1996

[54] IMAGE SIGNAL PROCESSING APPARATUS INTEGRATED ON SINGLE SEMICONDUCTOR SUBSTRATE

[75] Inventor: Hiroya Ito, Hashima, Japan

[73] Assignee: Sanyo Electric Co., Moriguchi, Japan

[21] Appl. No.: 312,095

[22] Filed: Sep. 26, 1994

[30] Foreign Application Priority Data

Sep. 30, 1993 [JP] Japan ................................. 5-245571
Sep. 30, 1993 [JP] Japan ................................. 5-245584

[51] Int. Cl.$^6$ ................................................ H04N 5/335
[52] U.S. Cl. ................................................ 348/312; 348/229
[58] Field of Search ..................................... 348/207, 229, 348/222, 294, 295, 296, 300, 301, 302, 303, 311, 312, 313, 315, 316, 255, 230; H04N 5/335

[56] References Cited

U.S. PATENT DOCUMENTS

| | | | |
|---|---|---|---|
| 4,556,911 | 12/1985 | Imaide et al. ........................... | 348/229 |
| 5,057,926 | 10/1991 | Watanabe ................................. | 348/294 |
| 5,268,764 | 12/1993 | Kihara et al. ............................ | 348/301 |

FOREIGN PATENT DOCUMENTS

| | | |
|---|---|---|
| 56-116374 | 9/1981 | Japan . |
| 62-055349 | 11/1987 | Japan . |
| 3-022768 | 1/1991 | Japan . |
| 3-048586 | 3/1991 | Japan . |

*Primary Examiner*—Joseph Mancuso
*Assistant Examiner*—Tuan V. Ho
*Attorney, Agent, or Firm*—Loeb & Loeb

[57] ABSTRACT

An image signal processing apparatus is here disclosed in which analog circuits such as a sample and hold circuit 10 for sampling an image signal Y1 (t) for every bit of image information, a reference circuit 11 for generating a reference voltage in synchronization with the sample and hold circuit 10, a differential amplifier 12 for amplifying a difference between outputs of both, and a gamma correction circuit 14 for subjecting the output of the differential amplifier 12 to a non-linear correction are constituted of MOS transistor circuits, and they are integrated, on a single substrate, together with a timing control circuit 19 and a digital signal processing circuit 17 which are digital circuits.

5 Claims, 7 Drawing Sheets

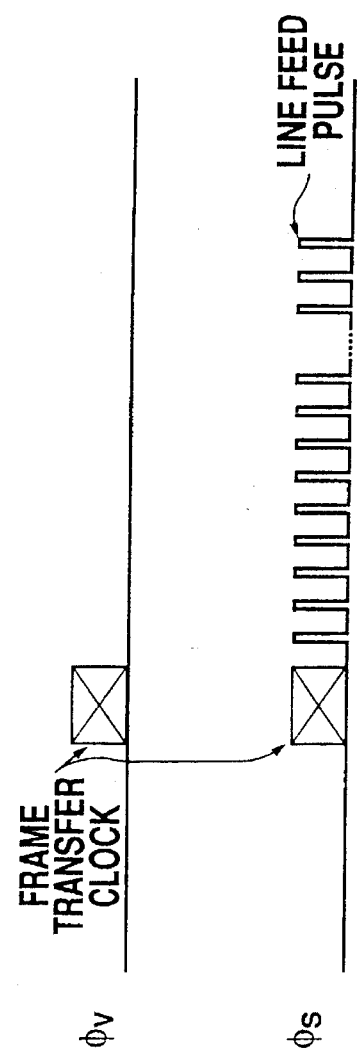
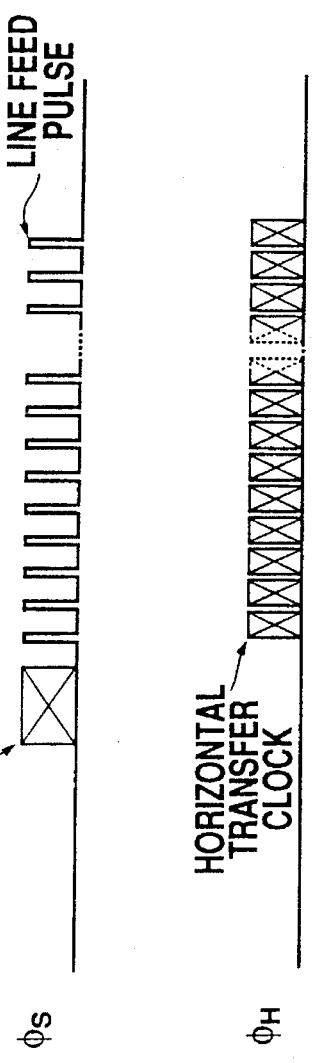
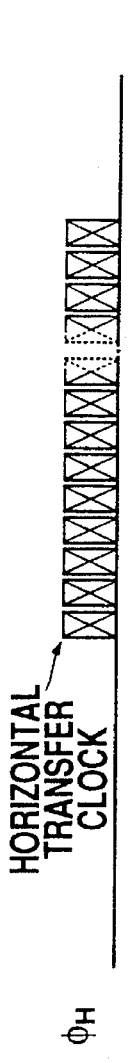
V-SYC
H-SYC
$\phi_V$
FRAME TRANSFER CLOCK
$\phi_S$
LINE FEED PULSE
$\phi_H$
HORIZONTAL TRANSFER CLOCK
Fig. 2A PRIOR ART
Fig. 2B PRIOR ART
Fig. 2C PRIOR ART
Fig. 2D PRIOR ART
Fig. 2E PRIOR ART

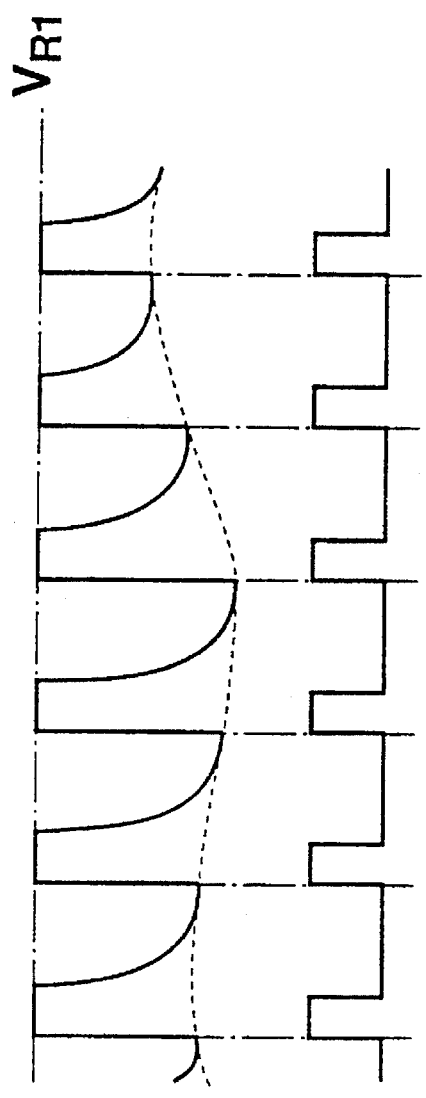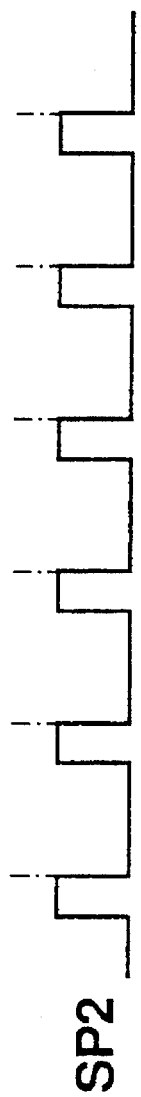
Fig. 5A  Fig. 5B  Fig. 5C  Fig. 5D

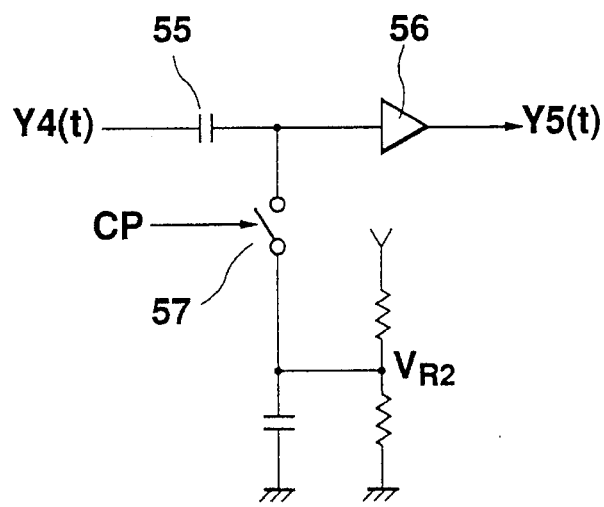
Fig. 8
Fig. 9A V5(t)
Fig. 9B CP

IMAGE SIGNAL PROCESSING APPARATUS INTEGRATED ON SINGLE SEMICONDUCTOR SUBSTRATE

BACKGROUND OF THE INVENTION

1. Field of the Invention

The present invention relates to an image signal processing apparatus which takes in the output of an image pickup device, conducts various processing operations, and then outputs an image signal having a predetermined format.

2. Description of the Related Art

An imaging device such as a TV camera using a CCD image pickup device is provided with a CCD driver for driving the CCD, a timing control circuit for controlling the operation timing of the CCD, and a signal processing circuit for conducting various processing operations in accordance with an output of a CCD to obtain a predetermined image signal. This kind of signal processing circuit is mainly constituted of a sample and hold circuit for sampling the output of the CCD, an automatic gain control circuit for constantly maintaining an average level of a signal, and a gamma correction circuit for causing the signal level on the reproduction side of an image to correspond to non-linear properties of a luminous brightness of a CRT.

FIG. 1 is a block diagram illustrating the constitution of a conventional imaging device, and FIG. 2 is a timing diagram illustrating its operation.

A CCD image pickup device 1 of a frame transfer type is constituted of an imaging area I, a storage area S, a horizontal transfer area H and an output section D. The imaging area I comprises a plurality of shift registers continuously arranged in a mutually parallel state in a vertical direction, and each bit of these shift registers is potentially sectioned by the function of electrodes to define a plurality of light receiving picture cells. The storage area S comprises a plurality of shift registers in succession to the respective shift registers of the imaging area I, and it receives and stores information charges from the shift registers of the imaging area I. The horizontal transfer area H comprises a single shift register in which each bit is caused to correspond to an output terminal of each shift register of the storage area S and it successively transfers and outputs the information charges received from the storage area S. The output section D is arranged on the output side of the horizontal transfer area H, and it converts the information charges output from the horizontal transfer area H into voltage values and outputs them. The imaging area I, the storage area S and the horizontal transfer area H of the CCD image pickup device 1 are connected to a V driver 2, an S driver 3 and an It driver 4, respectively. The V driver 2, the S driver 3 and the H driver 4 operate in accordance with a common reference clock. For example, the imaging area I and the storage area S are fed with four-phase transfer clocks φv and φs, respectively, and the horizontal transfer area H is fed with a two-phase transfer clock φH. In consequence, the information charge generated in the imaging area I of the CCD image pickup device 1 is first transferred from the imaging area I to the storage area S every one screen, in accordance with a frame transfer clock. Next, the information charge is transferred from the storage area S to the horizontal transfer area H every one horizontal line in accordance with a line feed pulse. Afterward, the information charge is further transferred from the horizontal transfer area H to the output section D in accordance with a horizontal transfer clock.

A CCD output taken out from the output section D of the CCD image pickup device i is subjected to various treatments such as sampling, amplification and gamma correction, in a signal processing circuit 5, and it is then output as an image signal to an external apparatus.

A timing control circuit 6 comprising a counter and a decoder receives a horizontal synchronizing signal H-SYC and a vertical synchronizing signal V-SYC, and motivates the V driver 2, the S driver 3 and the H driver 4 at a predetermined timing. That is to say, the timing control circuit 6 is reset by the horizontal synchronizing signal H-SYC, and a timing pulse of one horizontal scanning period for starting the S driver 3 and the H driver 4 is produced on the basis of an output of an H counter for counting a clock of a constant cycle and counting up in one horizontal scanning cycle. Then, the timing control circuit 6 is also reset by the vertical synchronizing signal V-SYC, and a timing pulse of one vertical scanning cycle for starting the V driver 2 and the S driver 3 is produced on the basis of an output of a V counter for counting the horizontal synchronizing signal H-SYC and operating in one vertical scanning period. Simultaneously, a sampling pulse, a clamp pulse and the like, which are required in the signal processing circuit 5, are produced so as to coincide with the operation timing of the CCD image pickup device 1, and then fed to the signal processing circuit 5.

In addition to the frame transfer clock, a discharging clock for discharging the information charge of the imaging area I therefrom is given to the imaging area I at timing earlier than the frame transfer clock, and a period from the discharging clock to the frame transfer clock is an exposure period of the CCD image pickup device 1. That is to say, in the CCD image pickup device 1 which always receives light, the information charges stored in the imaging area I are discharged to reset the imaging area I to a stored charge state of O, and after a predetermined period. A newly stored information charge is then transferred and output, whereby the exposure period is set every one screen. Techniques for setting this exposure period are disclosed in, for example, Japanese Patent Application Nos. 157369/1989 and 183976/1989 filed by the same applicant as in the present application.

In the case of the imaging devices typified by TV cameras with a video and the like, miniaturization and weight-saving are desired, and it is one important theme to decrease the number of parts constituting each device. In particular, the decrease of the number of elements constituting each circuit is effective to simplify wiring and to miniaturize a circuit substrate, and hence for the integration of peripheral circuits of the CCD image pickup device 1, various measures have been taken.

However, the signal processing circuit 5 is constituted of a bipolar transistor circuit capable of easily causing a linear operation in accordance with an analog signal, whereas the timing control circuit 6 and a circuit for generating the horizontal synchronizing signal H-SYC and the vertical synchronizing signal V-SYC are each constituted of an MOS transistor circuit suitable for a pulse operation. Therefore, as peripheral circuits for the CCD image pickup device 1, there are required a circuit block comprising an MOS transistor for receiving clocks to generate various kinds of pulses, and a circuit block comprising a bipolar transistor for receiving a CCD output to output an image signal. As described above, the two kinds of circuit blocks are formed as the different integrated circuit chips, respectively. Consequently, in constructing the imaging device using the CCD image pickup device 1, at least two chips are mounted in addition to the CCD image pickup device 1.

Furthermore, in the output section D of the CCD image pickup device 1, the storage and the output of the information charges are repeated in compliance with the transfer operation of the horizontal transfer area H. Therefore, a CCD output which is output from the CCD image pickup device 1 alternately repeats a reference level (a voltage level in an information charge-free state) and a signal level (a voltage level corresponding to tile stored information charges) at a cycle corresponding to the operation of the output section D. Thus, in the signal processing circuit 5, sampling is carried out so as to take in only the signal level portion alone. However, the reference level becomes unstable sometimes, under the influence of noise generated in the output section D or the sample and hold circuit, and there is a problem that the sampled signal level does not always correspond to the original image information.

In order to solve such a problem, for example, Japanese Patent Publication No. 55349/1987 has suggested a circuit called correlated double sampling in which the signal level and the reference level are sampled and a difference between these levels is then taken out. However, for the purpose of realizing the correlated double sampling, it is necessary to combine the above-mentioned circuit with a plurality of sample and hold circuits and a differential amplifier, and in order to arrange them on a circuit substrate, a wide area is required. In addition, it can also be conceived that these circuits are constituted in the form of an integrated circuit, but it is difficult to constitute, in the form of one chip, the circuit for the correlated double sampling which comprises the bipolar transistor and the peripheral circuits for the CCD image pickup device 1 which comprises the MOS transistors. In consequence, the chips constituting the peripheral circuits and the wiring inconveniently increase.

SUMMARY OF THE INVENTION

An object of the present invention is to integrate, on a single substrate, a digital circuit for controlling the drive of an image pickup device and an analog circuit for processing an image signal which is an output from the image pickup device, i.e., to integrate these circuits into one chip, thereby achieving the simplification of wiring and tile miniaturization of a circuit substrate.

Another object of the present invention is to obtain a stable image signal from which any influence on the analog circuit from cyclic noise generated in the digital circuit, is removed at the time of the integration of the digital circuit and the analog circuit on the single substrate.

A first aspect of the present invention is directed to an image signal processing apparatus for controlling the operation timing of an image pickup device and processing the output signal of the image pickup device, which comprises:

a gain control circuit for amplifying the image signal formed on the basis of a signal containing image information in every bit output from the image pickup device, and bringing the average level in a predetermined period of the image signal close to a constant value, and a timing control circuit which generates a timing signal for controlling the timing of the horizontal scanning and the vertical scanning of the image pickup device by digital signal processing, the gain control circuit being constituted of a circuit utilizing a MOS transistor, the gain control circuit and the timing control circuit being integrated on a single semiconductor substrate.

As described above, the gain control circuit which is an analog circuit is constituted of the circuit utilizing the MOS transistor, and the timing control circuit which is a digital circuit is integrated on the single semiconductor substrate, whereby a driving circuit of the image pickup device and a processing circuit of the output signal are integrated into one chip. Therefore, the number of elements can be reduced, whereby the simplification of wiring between the elements and the decrease of a mounting area on a circuit substrate can be achieved. Since the digital circuit block is integrated, external circuits for regulating a voltage value in the analog circuit can be remarkably reduced. In consequence, miniaturization and weight-saving of the imaging device, as well as a decrease of cost, can be accomplished.

A second aspect of the present invention is directed to an integrated circuit obtained by integrating a gain control circuit, a timing control circuit, a sample and hold circuit, a correction circuit, an A/D conversion circuit, a digital processing circuit and a D/A conversion circuit on a single semiconductor substrate. According to this constitution, many circuits can be accommodated on one chip.

A third aspect of the present invention is directed to an image signal processing apparatus comprising:

a sample and hold circuit for sampling image information every bit output from an image pickup device to obtain an analog image signal having the continuous image information, a reference voltage generating circuit for taking in a constant voltage in synchronization with the sampling operation of the sample and hold circuit to generate a reference voltage, and a gain control circuit for amplifying a difference between this reference voltage and an output from the sample and hold circuit at a timing corresponding to the reference voltage to bring an average level of a predetermined period of the image signal close to a constant value, the reference voltage generating circuit and the gain control circuit being integrated on a single semiconductor substrate.

Therefore, the reference voltage which is given to the gain control circuit can be obtained by the same circuit as the sample and hold circuit, and noise generated by the sampling operation can be canceled by the gain control circuit.

In particular, since the gain control circuit can be constituted of a differential amplifier for receiving the reference voltage and a sampling voltage to amplify a difference between these voltages, the noise can be effectively removed by the simple circuit to obtain the stable image signal.

Furthermore, the reference circuit can also be constituted by the utilization of a MOS transistor and integrated on the single substrate, as in the case of the sample and hold circuit, whereby the simplification and the miniaturization of the device can be achieved, as in the above-mentioned case.

BRIEF DESCRIPTION OF THE DRAWINGS

FIG. 2 is an operation timing diagram of the conventional solid imaging device.

FIG. 5 is an operation timing diagram of the sample and hold circuit.

FIG. 8 is a circuit diagram of a clamp circuit.

FIG. 9 is an operation timing diagram of the clamp circuit.

DETAILED DESCRIPTION OF THE INVENTION

Figure 3:
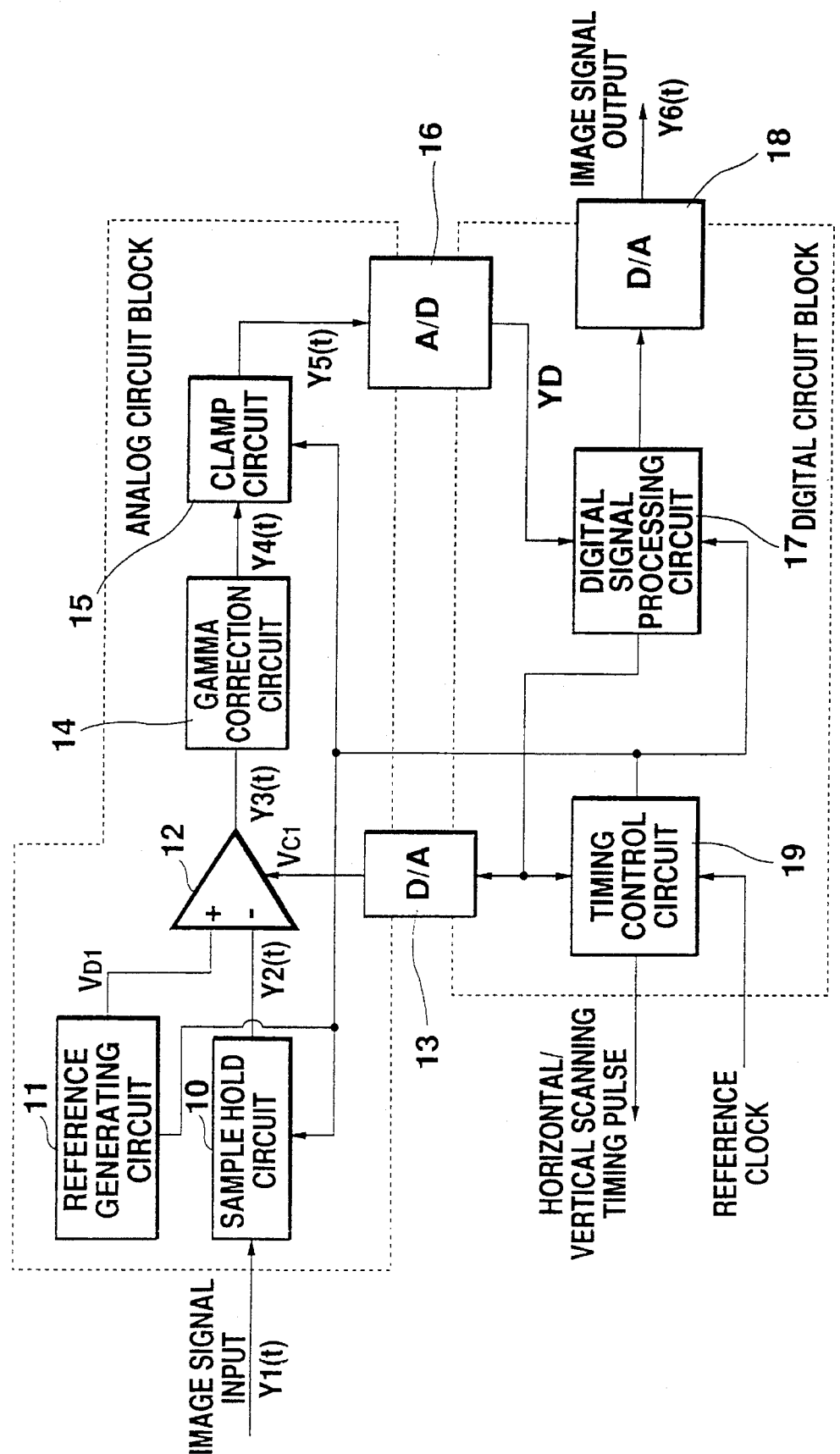
FIG. 3 is a block diagram illustrating the constitution of an image signal processing apparatus of the present invention.

FIG. 3 is a block diagram illustrating the constitution of a signal processing device of the present invention.

Figure 1:
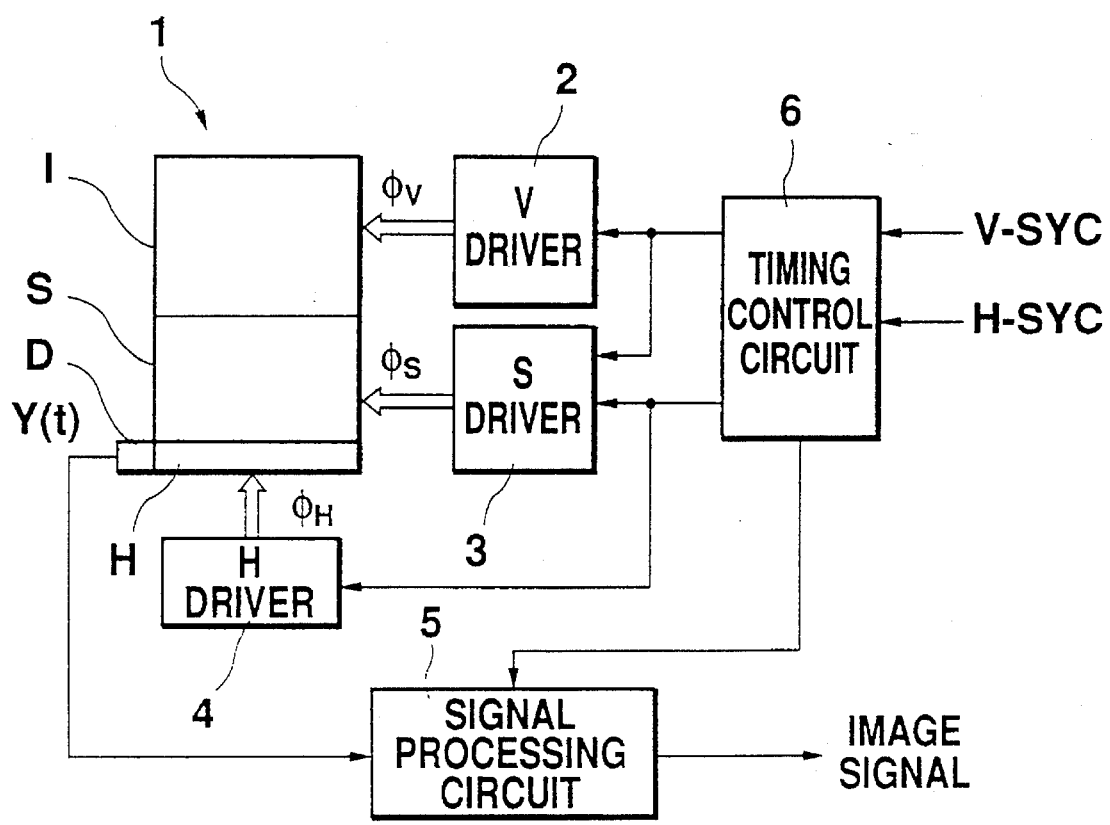
FIG. 1 is a block diagram illustrating the constitution of a conventional solid imaging device.

A sample and hold circuit 10 receives an image signal Y1 (t) for repeating a reference level and a signal level at a predetermined clock cycle, samples the signal level portion, and then outputs an image signal Y2 (t) for maintaining the signal level for a period of 1 clock. In this case, the image signal Y1 (t) is given by a known CCD image pickup device, and tile sample and hold circuit 10 is additionally provided with the CCD image pickup device and drivers, as in FIG. 1.

A reference voltage generating circuit (reference generating circuit) 11 has the same circuit constitution as in the sample and hold circuit (sample hold circuit) 10 and it takes in a constant voltage at the same timing as in the sample and hold circuit 10 and generates a reference voltage $V_{D1}$. A gain control type differential amplifier 12 takes in the image signal Y2 (t) output from the sample and hold circuit 10 and the reference voltage $V_{D1}$ output from the reference voltage generating circuit 11, and it then gives a gain corresponding to the gain control voltage $V_{C1}$, and outputs an image signal Y3 (t). Here, the gain control voltage $V_{C1}$ is set on the basis of a value obtained by integrating an image signal Y3 (t) with 1 vertical scanning period unit, and the value of the gain control voltage $V_{C1}$ is set so as to decrease the gain if the integrated value is large, and to increase the gain if the integrated value is small. That is to say, by variably setting the gain on the basis of the integrated value every vertical scanning period of the image signal Y3 (t), such a feedback control as controls the integrated value within a predetermined range, so-called automatic gain control (AGC), is carried out.

For example, control data given by a digital signal processing circuit 17 of a digital circuit block, which will be described hereinafter, is converted into a control voltage $V_{C1}$ by a D/A conversion circuit 13, and then fed to a gain control terminal of a differential amplifier 12. A gamma correction circuit 14 outputs a non-linear image signal Y4 (t), in accordance with the image signal Y3 (t) output from the differential amplifier 12 so as to correspond to the non-linear properties of the luminous brightness of a CRT, to a signal level on the reproduction side. This conversion into the non-linear image signal is usually carried out in accordance with an equation $Y=aX^r$ (X: an input signal level, Y: an output signal level, and "a": an optional constant), and in an ideal case, "r" is set to 0.45. A clamp circuit 15 clamps a reference level set at the end (or the start) of each horizontal scanning period of the image signal Y4 (t) output from the gamma correction circuit 14, and then outputs an image signal Y5 (t) in which the reference level is fixed to a predetermined value. Next, an A/D conversion circuit 16 converts the image signal Y5 (t) output from the clamp circuit 15 into digital data, and then feeds them as image data YD to the digital circuit block.

The sample and hold circuit 10, the reference voltage generating circuit 11, the differential amplifier 12, the gamma correction circuit 14, and an analog circuit block comprising the clamp circuit 15, are each constituted of a MOS transistor circuit. The constitution of each circuit will be described hereinafter.

A digital signal processing circuit 17 processes a line interpolation, a level correction and the like in accordance with the image data YD given from the analog circuit block and produces various kinds of control data from the image data YD. These control data are used for a flexible control of the exposure period of the CCD image pickup device and for AGC by the differential amplifier 12. For example, the digital signal processing circuit 17 integrates the image data YD every one screen unit, i.e., one vertical scanning period, and then outputs the thus integrated value as each control data. A D/A conversion circuit 18 converts the image data YD subjected to the predetermined processing in the digital signal processing circuit 17 into an analog value again, and then outputs it to an external apparatus as an image signal Y6 (t).

A timing control circuit 19 generates a timing pulse for deciding each timing of the horizontal scanning and the vertical scanning of the CCD Image pickup device on the basis of a reference clock fed from the outside, and simultaneously generates each signal processing pulse so that the operation of each section on the above-mentioned signal processing route may be synchronized with the operation of the CCD image pickup device. For example, the signal processing of the respective image signals Y1 (t) to Y5 (t) can be conducted at a proper timing by feeding the sampling pulse in synchronization with an output timing every one bit from the CCD image pickup device to the sample and hold circuit 10, and then feeding the clamp pulse in synchronization with a horizontal scanning timing to the clamp circuit 15. Furthermore, the timing control circuit 19 can be constituted so that an operation timing of the CCD image pickup device may be decided on the basis of the control data given from the digital signal processing circuit 17, so that an automatic iris control can be realized which can change the exposure period of the CCD image pickup device in compliance with the brightness of a subject.

The digital circuit block comprising the digital signal processing circuit 17 and the timing control circuit 19 is integrated in the form of a circuit together with the analog circuit block, tile A/D conversion circuit 16 and the D/A conversion circuits 18 comprising the MOS transistor circuits on a single semiconductor substrate. The one-chip structure of the analog circuit block and the digital circuit block constituted in this way permits the simplification of the wiring of peripheral circuits of the CCD image pickup device and the reduction of the number of elements.

Figure 4:
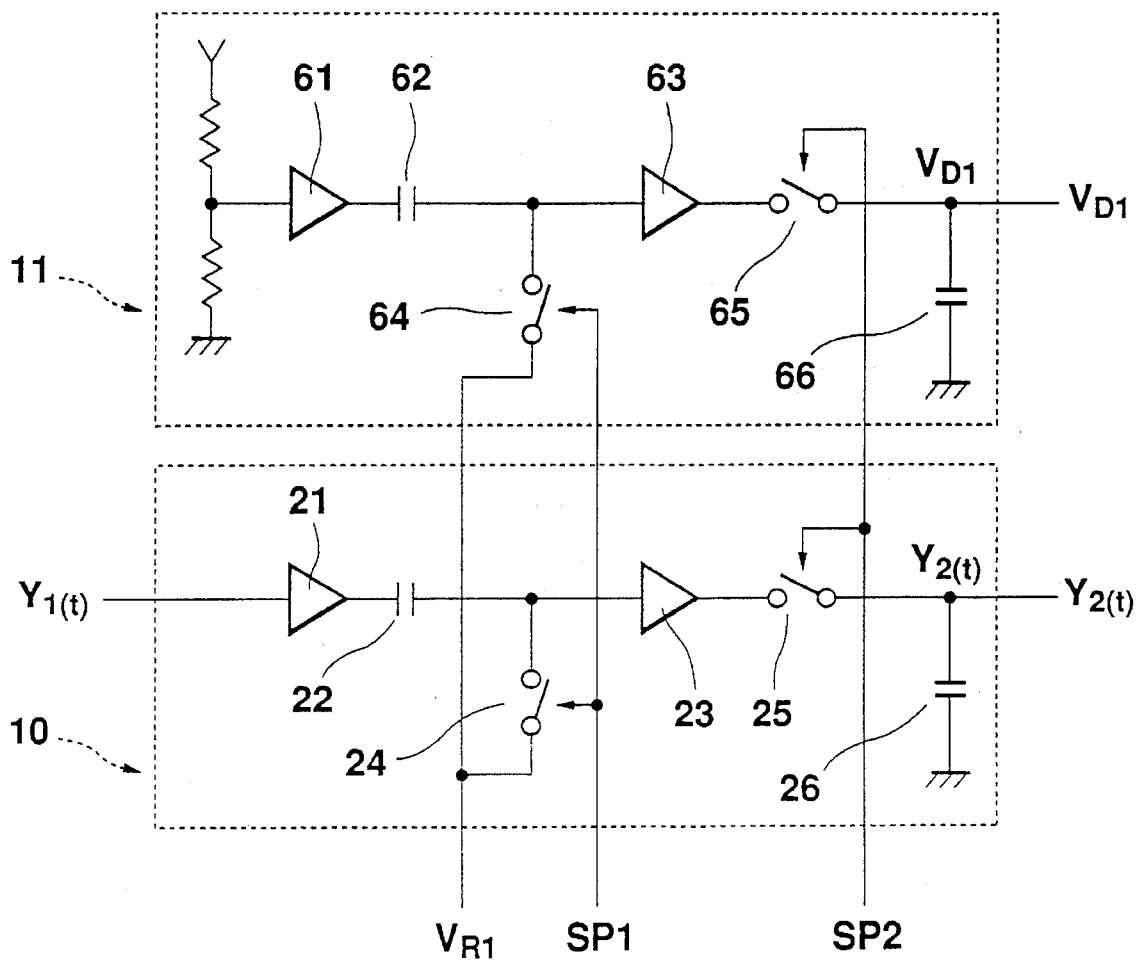
FIG. 4 is a circuit diagram including a sample and hold circuit and a reference voltage generating circuit.

FIG. 4 is a circuit diagram including the sample and hold circuit 10 and tile reference voltage generating circuit 12, and FIG. 5 is a timing diagram illustrating its operation.

In the sample and hold circuit 10, the image signal Y1 (t) which is an input signal is connected to one end of a first capacitor 22 via a first buffer 21, and the other end of this capacitor 22 is connected to a second buffer 23. The input side of the second buffer 23 is fed with a constant voltage $V_{R1}$ via a first switch 24 which operates in response to a first sampling pulse SP1. The output of the second buffer 23 is fed to a second capacitor 26 whose one end is grounded via a second switch 25 which operates in response to a second sampling pulse SP2. Then, a fluctuation of the voltage of this capacitor 26 is taken out as the image signal Y2 (t). In this connection, the switches 24, 25 and the buffers 21, 23 are each constituted of an MOS transistor.

In the image signal Y1 (t) which is input to the first buffer 21, tile reference level and the signal level are repeated at a constant clock cycle, as shown in FIG. 5. This is due to the fact that the discharge and the storage of the information charges to be transferred and output are repeated in an output section of the CCD image pickup device, and a potential in the output section from which the information charges have been released is at the reference level, and a potential corresponding to the amount of the stored information charges is at the signal level. Thus, when the first switch 24 is turned on in response to the sampling pulse SP1 whose timing corresponds to the period of the reference level of the image signal Y1 (t), the reference level of the image signal Y1 (t) is fixed to a voltage $V_{R1}$. In consequence, even if the reference level of the image signal Y1 (t) fluctuates under the influence of noise or the like, the stable image signal Y1 (t) at the reference level is applied to the second buffer 23. Furthermore, if the second switch 25 is turned on in response to the sampling pulse SP2 whose timing corresponds to the period of the signal level of the image signal Y1 (t), a voltage corresponding to a difference between the reference level and the signal level is applied to the second capacitor 26. Therefore, after the reference level is fixed to a voltage $V_{R1}$, only the signal level portion of the image signal Y1 (t) is output as the image signal Y2 (t).

The reference voltage generating circuit 11 constitutes the same circuit structure as in the sample and hold circuit 10, and a constant voltage taken out by the resistance division of a power source voltage is fed to one end of a first capacitor 62 via a first buffer 61. The other end of this capacitor 62 is connected to a second buffer 63, and a constant voltage $V_{R1}$ is fed to the input side of this second buffer 63 via a first switch 64 which operates in response to the first sampling pulse SP1 common to tile sample and hold circuit 10. Next, an output of the second buffer 63 is similarly taken out as a reference voltage $V_{D1}$ via a second switch 65 which operates in response to the second sampling pulse SP2 common to the sample and hold circuit 10. Moreover, a second capacitor 66 which maintains the output level while the second switch 65 is turned off is connected to the output side of tile second buffer 63. In this connection, the switches 64, 65 and the buffers 61, 63 are each constituted of an MOS transistor.

This reference voltage $V_{D1}$ is produced via a route through which the image signal Y3 (t) passes, and therefore the reference voltage $V_{D1}$ contains the same noise as in the image signal Y3 (t). In consequence, the noise of the image signal Y3 (t) can be offset with the noise of the reference voltage $V_{D1}$ in the differential amplifier 12.

Figure 6:
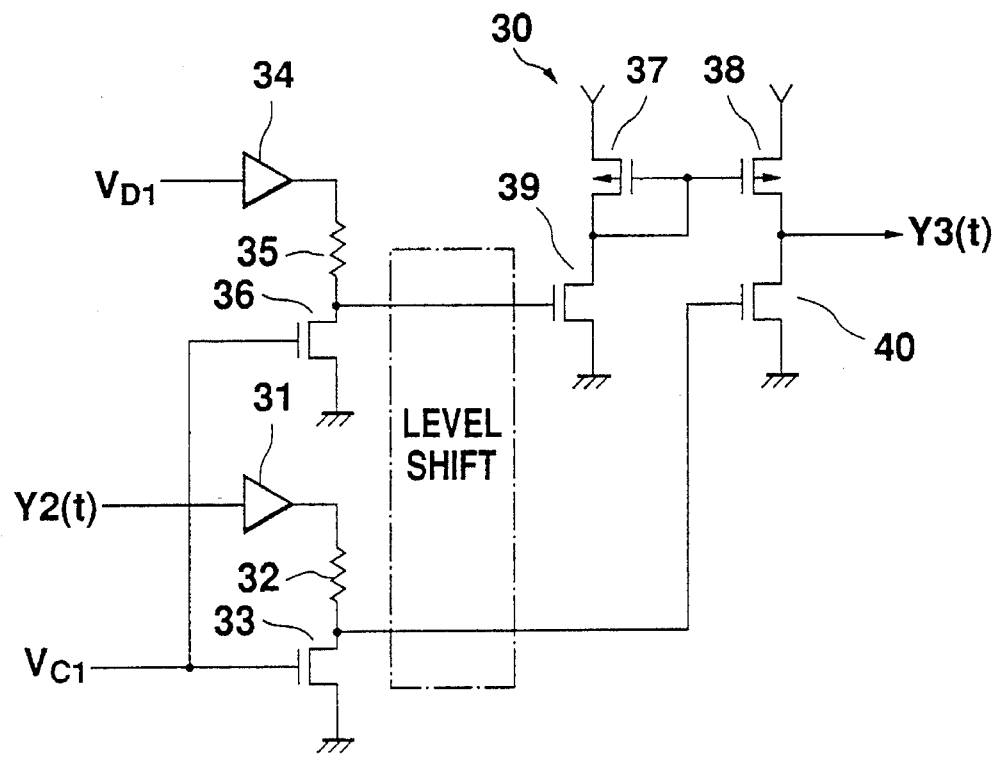
FIG. 6 is a circuit diagram of a gain control circuit.

FIG. 6 is a circuit diagram of the differential amplifier 12.

The image signal Y2 (t) is input to a first resistor 32 via the first buffer 31, and a drain of an N channel type MOS transistor 33 is connected to this resistor 32. To a gate of this MOS transistor 33, the control voltage $V_{C1}$ for the gain control is applied, and its source is grounded. Furthermore, the reference voltage $V_{D1}$ which is the output of the reference voltage generating circuit 11 is input to a second resistor 35 via a second buffer 34, and a drain of an N channel type MOS transistor 36 is connected to this resistor 35. To a gate of this MOS transistor 36, the control voltage $V_{C1}$ common to the MOS transistor 33 is applied, and its source is grounded. The drains of the two MOS transistors 33, 36 which are arranged in parallel in this way are connected to inputs of a differential amplifier 30 comprising an MOS transistor. Between the drains of the MOS transistors 33, 36 and the differential amplifier 30, a level shift circuit may be provided, if necessary. In the differential amplifier 30, the power source is connected to sources of two P channel type MOS transistors 37, 38 having gates which are connected to each other, and these gates are connected to the drain of a MOS transistor 37. Two N channel type MOS transistors 39, 40 whose sources are grounded are directly connected to the MOS transistors 37, 38 to constitute a current mirror circuit. The two gates, as the inputs, of MOS transistors 39, 40 receive potentials on the drain sides of the MOS transistors 33, 36, and they output the image signal Y3 (t) from the drain side of the MOS transistor 38.

Here, if the control voltage $V_{C1}$ which is applied to the gates of the MOS transistors 33, 36 rises, the MOS transistors 33, 36 tend to turn on, so that an ON-state resistance lowers and the potential on the drain side lowers. If the potentials on the drain sides of the MOS transistors 33, 36 which are inputs of the differential amplifier 30, lower, the MOS transistors 39, 40 of the differential amplifier 30 tend to turn off, so that the gain of the differential amplifier 30 decreases. Conversely, if the control voltage $V_{C1}$ lowers, the MOS transistors 33, 36 tend to turn off, so that an ON-state resistance rises, the potentials on the drain sides rise, and the gain of the differential amplifier 30 increases. Now, if the circuit is so comprised that the control voltage $V_{C1}$ may be obtained from the control data produced in the digital signal processing circuit 17 of the digital circuit block, such a feedback control as stores an average level of one screen of the output image signal Y3 (t) in a proper range is given.

Figure 7:
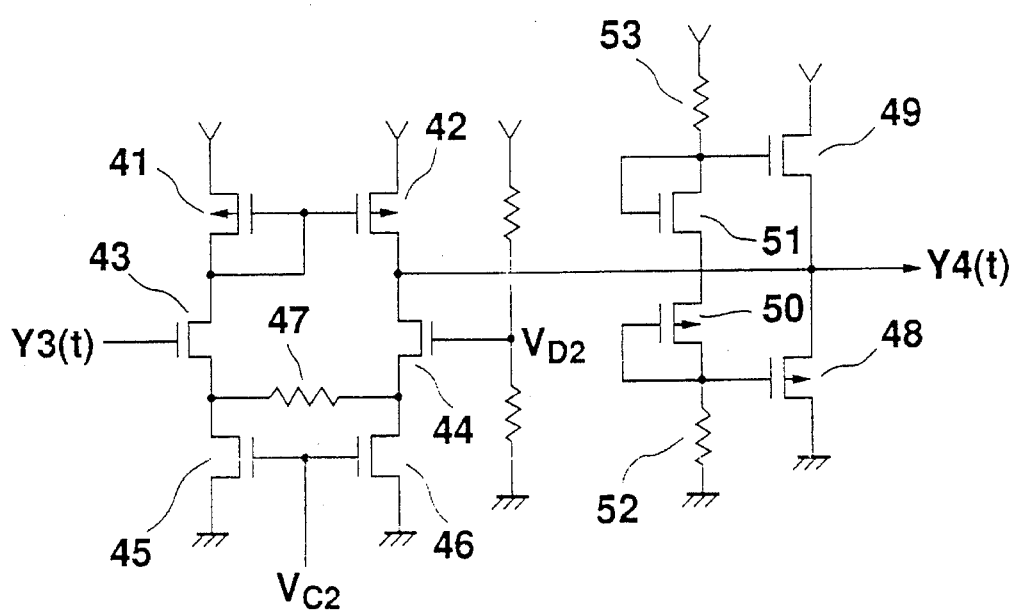
FIG. 7 is a circuit diagram of a gamma correction circuit.

FIG. 7 is a circuit diagram of a gamma correction circuit 14.

Two P channel type MOS transistors 41, 42 are connected in parallel to a power source, and gates of the respective transistors are connected to a drain of the MOS transistor 41. To the two MOS transistors 41, 42, two N channel type MOS transistors 43, 44 are respectively connected in series. The sources of MOS transistors 43, 44 are grounded via N channel type MOS transistors 45, 46 to whose gates a control voltage $V_{C2}$ is applied, and these MOS transistors 43, 44 are connected to each other via a resistor 47 to constitute a current mirror circuit. Then, the image signal Y3 (t) is input to the gate of the MOS transistor 43, and a constant voltage $V_{D2}$ obtained by the resistance division of a power source voltage is applied to the gate of the MOS transistor 44.

The drain of the MOS transistor 42 is connected to the source of a P channel type MOS transistor 48 having a grounded drain and the source of an N channel type MOS transistor 49 having a drain connected to a power source. Two voltages obtained by dividing the power source voltage by a diode-connected P channel type MOS transistor 50, an N channel type MOS transistor 51 and two resistors 52, 53 are applied to gates of these MOS transistors 48, 49, respectively. The two voltages are set near to thresholds of the MOS transistors 48, 49, and the MOS transistors 48, 49 are in an intermediate state between "on" and "off". Thus, the image signal Y4 (t) is taken out from the source sides of the MOS transistors 48, 49, and it is then output.

Here, when the level of the image signal Y3 (t) which is an input signal lowers and the MOS transistor 43 is turned off, the potential on the drain side of the MOS transistor 43 rises, so that the MOS transistors 41, 42 are turned off. At this time, the gate voltages of the MOS transistors 44, 46 are fixed, and therefore current runs into the MOS transistors 44, 46 through the MOS transistor 49. Conversely, when the level of the image signal Y3 (t) rises and the MOS transistor 43 is turned on, the potential on the drain side of the MOS transistor 43 lowers, so that the MOS transistors 41, 42 are turned on. Similarly, the gate voltages of the MOS transistors 44, 46 are fixed, and therefore current which flows through the MOS transistor 42 runs to ground through the MOS transistor 48. The MOS transistors 48, 49 in which current-voltage properties are square properties are connected to the output side, tile power source side and the ground side being reversed. Hence, the change of the potential on the source side of the MOS transistors 48, 49, i.e., the change of the level of the image signal Y4 (t) to the current which flows from the MOS transistor 49 to the MOS transistors 44, 46, or the current which flows from the MOS transistor 42 to the MOS transistor 48 shows ½ power properties to the change of the current. Therefore, if tile control voltage $V_{C2}$ which is applied to the gates of the MOS transistors 45, 46 is regulated so that the change of the current which flows through the MOS transistors 48, 49 may be proportional to the change of the image signal Y3 (t), there can be obtained the image signal Y4 (t) in accordance with characteristics of $Y=X^{0.5}$ to the image signal Y3 (t). As a result, the non-linear image signal Y4 (t) which is non-linear to the image signal Y3 (t) is output.

FIG. 8 is a circuit diagram of a clamp circuit 15, and FIG. 9 is a timing diagram showing its operation.

The input image signal Y4 (t) is fed to one end of a capacitor 55, and the other end of this capacitor 55 is connected to a buffer 56. Furthermore, a constant voltage $V_{R1}$ is fed to the input side of the buffer 56 via a switch 57 which operates in response to a clamp pulse CP. Then, the output of the buffer 56 is output as the image signal Y5 (t). In this connection, the switch 54 and the buffer 56 are each constituted of a MOS transistor.

As shown in FIG. 9, the image signal Y4 (t) input to the capacitor 55 is continuous in one horizontal scanning period unit, and optical black levels are set at the beginning and the end of each horizontal scanning period. This optical black level corresponds to an optical black region formed in a part of the imaging area I of the CCD image pickup device, i.e., the output from a light receiving element covered with a light shielding film, and it is the reference value of a subsequent signal processing operation. Thus, when switch 57 is turned on in response to a clamp pulse CP whose timing coincides with the period of the reference level of the image signal Y4 (t), the optical black level of the image signal Y4 (t) Is fixed to a voltage $V_{R2}$. In consequence, even if the optical black level of the image signal Y4 (t) fluctuates during the course of the signal processing, the image signal Y4 (t) having the stable reference level is taken into the buffer 56.

As described above, the sample and hold circuit 10, the reference voltage generating circuit 11, the differential amplifier 12, the gamma correction circuit 14 and the clamp circuit 15 are each constituted of a MOS transistor circuit, and they can be integrated in the form of an integrated circuit together with the respective sections of the digital circuit block.

What is claimed is:

1. An image signal processing apparatus for controlling the operation timing of an image pickup device and processing the output signal of the image pickup device, which comprises:

a sample and hold circuit for sampling, every bit, image information for every bit output from an image pickup device to obtain an image signal having the continuous image information, a reference voltage generating circuit for holding in a predetermined voltage in synchronization with the sampling operation of said sample and hold circuit to generate a reference voltage, and a differential amplifier for amplifying a difference between a reference voltage from said reference voltage generating circuit and an output voltage from said sample and hold circuit of timing corresponding to this reference voltage, said sample and hold circuit, said reference voltage generating circuit and said differential amplifier being integrated on a single semiconductor substrate.

2. The image signal processing apparatus according to claim 1 wherein the differential amplifier changes the gain so as to bring the average level of predetermined periods of the image signal close to a constant value.

3. The image signal processing apparatus according to claim 2 wherein said sample and hold circuit, said reference voltage generating circuit and said differential amplifier are each constituted of a circuit consisting of a MOS transistor.

4. An image processing apparatus for controlling the operation timing of an image pickup device and processing the output signal of the image pickup device, which comprises:

a gain control circuit for amplifying the image signal formed on the basis of a signal containing image information for every bit output from the image pickup device, and bringing the average level in a predetermined period of the image signal close to a constant value;

a timing control circuit which generates, using digital signal processing, a timing signal for controlling the timing of the horizontal and the vertical scanning of the image pickup device;

a sample and hold circuit for sampling, every bit, image information for every bit output from the image pickup device to obtain an analog image signal having the continuous image information;

a correction circuit which converts a signal output by said gain control circuit with non-linear conversion processing;

an A/D conversion circuit for converting the output of said correction circuit;

a digital signal processing circuit for processing digital data from said A/D conversion circuit to generate gain control data for controlling a gain in said gain control circuit; and a D/A conversion circuit for converting the gain control data from said digital signal processing circuit into an analog signal and feeding this analog signal to said gain control circuit, said gain control circuit, said sample and hold circuit, and said correction circuit being constituted of a circuit utilizing a MOS transistor, wherein an ON-state resistance of said MOS transistor varies in response to a voltage applied to a gate of said MOS transistor, and said gain control circuit, said timing control circuit, said sample and hold circuit, said correction circuit, said A/D conversion circuit, said digital signal processing circuit, and said D/A conversion circuit being integrated on a single semiconductor substrate.

5. The image signal processing apparatus according to claim 4 which further contains a clamp circuit for fixing the voltage value of the optical black level of the image signal to a predetermined voltage, said optical black level being situated on the vicinity to the beginning or the end portion of each horizontal scanning period of the image signal, said clamp circuit being constituted of a circuit utilizing a MOS transistor, and being integrated together with said gain control circuit, said timing control circuit, said sample and hold circuit, said correction circuit, said A/D conversion circuit, said digital processing circuit and said D/A conversion circuit on the single semiconductor substrate.

\* \* \* \* \*